United States Patent
Marchand et al.

(10) Patent No.: US 11,413,634 B2
(45) Date of Patent: Aug. 16, 2022

(54) PNEUMATIC SUPPLY THROUGH A VALVE CAP

(71) Applicant: Pomtava SA, Reconvilier (CH)

(72) Inventors: Euphemien Marchand, Reconvilier (CH); Alois Nicolet, Reconvilier (CH)

(73) Assignee: POMTAVA SA, Reconvilier (CH)

( * ) Notice: Subject to any disclaimer, the term of this patent is extended or adjusted under 35 U.S.C. 154(b) by 0 days.

(21) Appl. No.: 16/634,918

(22) PCT Filed: Aug. 3, 2018

(86) PCT No.: PCT/EP2018/071094
§ 371 (c)(1),
(2) Date: Jan. 29, 2020

(87) PCT Pub. No.: WO2019/034449
PCT Pub. Date: Feb. 21, 2019

(65) Prior Publication Data
US 2020/0238307 A1    Jul. 30, 2020

(30) Foreign Application Priority Data
Aug. 15, 2017   (FR) ...................................... 1757683

(51) Int. Cl.
*B05B 1/30*       (2006.01)
*B05C 5/02*       (2006.01)
(Continued)

(52) U.S. Cl.
CPC ............ *B05B 1/306* (2013.01); *B05B 7/0815* (2013.01); *B05B 7/1263* (2013.01);
(Continued)

(58) Field of Classification Search
None
See application file for complete search history.

(56) References Cited

U.S. PATENT DOCUMENTS 2,215,668 A * 9/1940 Smith .................. B05B 7/1272
                                              118/685
3,410,518 A * 11/1968 Carsten ................. F16K 31/363
                                              251/31
(Continued)

FOREIGN PATENT DOCUMENTS

EP    2 628 390 A2    8/2013
FR    1 285 687 A     2/1962
(Continued)

OTHER PUBLICATIONS

Machine Language Translation of FR 1285687A.
(Continued)

*Primary Examiner* — Binu Thomas
(74) *Attorney, Agent, or Firm* — Jacob Eisenberg

(57) ABSTRACT

A device for spraying a coating product in liquid form, includes
  a valve for controlling the flow of the liquid product,
  a piston, secured to a needle arranged to free or block a passage of liquid product,
  a valve body including a housing arranged to accommodate the piston, and including a control fluid supply connector arranged on the bottom dead center side of the piston, and
the valve body is monolithic and further includes at least one control fluid supply channel accommodated in a side wall of the valve body and whose at least one longitudinal portion extends along part of the housing from the supply connector side to the top dead center side of the piston.

10 Claims, 4 Drawing Sheets

(51) Int. Cl.
*F16K 31/363* (2006.01)
*B05B 7/08* (2006.01)
*B05B 7/12* (2006.01)
*B33Y 10/00* (2015.01)
*B33Y 80/00* (2015.01)
*B05B 15/65* (2018.01)
*B05B 13/04* (2006.01)

(52) U.S. Cl.
CPC .......... B05C 5/0237 (2013.01); F16K 31/363 (2013.01); *B05B 13/0431* (2013.01); *B05B 15/65* (2018.02); *B33Y 10/00* (2014.12); *B33Y 80/00* (2014.12)

(56) References Cited

U.S. PATENT DOCUMENTS

| | | | | |
|---|---|---|---|---|
| 3,911,955 A | * | 10/1975 | Link | ..................... F16K 31/004 251/31 |
| 4,711,379 A | * | 12/1987 | Price | ..................... B05C 5/001 137/625.64 |
| 2013/0122199 A1 | * | 5/2013 | Huda | ................... B05B 13/0431 239/418 |
| 2013/0341428 A1 | * | 12/2013 | Huda | ................... B05B 13/0431 239/408 |

FOREIGN PATENT DOCUMENTS

| WO | WO 2013/071398 A1 | 5/2013 |
|---|---|---|
| WO | WO 2019/03449 A1 | 2/2019 |

OTHER PUBLICATIONS

Written Opinion for FR 1757683, Priority Document of WO2019/034449A1.

Search Report for FR 1757683, Priority Document of WO2019/034449A1.

* cited by examiner

PNEUMATIC SUPPLY THROUGH A VALVE CAP

CROSS REFERENCE TO RELATED APPLICATIONS

This application is a national phase of International Application No. PCT/EP2018/071094, filed on Aug. 3, 2018, which claims priority to French Patent Application No. 1757683, filed on Aug. 15, 2017. The contents of the above-referenced applications are expressly incorporated herein by reference to their entireties.

FIELD

The present invention generally relates to a device for spraying a coating product in liquid form, and to a method for manufacturing such a device.

Devices for spraying liquid coating are known in the prior art.

BACKGROUND

Document FR2674773 discloses a compressed-air gun. In return, this system has in particular the disadvantage of being bulky, and of being provided with machining holes and a drilled block, increasing the overall dimension of the portable device as well as the risk of leakage, causing a defective control risk. In addition, document WO 2013/071398 discloses an applicator for spraying an elastomeric material.

SUMMARY

An object of the present invention is to address the disadvantages of the documents of the prior art mentioned above and particularly, first of all, to propose a compact and efficient device for spraying coating product in liquid form, whose risk of leakage is reduced, whose grip is improved and whose control is secured.

For this purpose, a first aspect of the invention relates to a device for spraying a coating product in liquid form, comprising:
  means for spraying the liquid product,
  a valve for controlling the flow of the liquid product towards the spraying means,
the valve being actuated by a control fluid and comprising:
  a piston arranged to be moved by the control fluid between a top dead center and a bottom dead center,
  a needle secured to the piston and arranged to free or block a passage of liquid product towards the spraying means,
  a valve body comprising a housing arranged to accommodate the piston, and comprising a control fluid supply connector arranged on the bottom dead center side,
the device being characterized in that the valve body is monolithic and further comprises at least one control fluid supply channel formed in a side wall of the valve body and whose at least one longitudinal portion extends along part of the housing from the supply connector side to the top dead center side.

This allows proposing a device for spraying a particularly compact liquid coating product, and whose monolithic body does not have plugged holes or openings only intended for making the supply channel, eliminating the risks of leakage at the plugs or blocked parts. In other words, the monolithic body is free from subsequently sealed machining holes.

This also allows improving the portability of the device and its easy manipulation by an operator. In addition, this allows securing the control of the flow of the coating liquid product, in particular thanks to a reduction of the risk of leakage and to an improvement of the efficiency and reactivity of the valve.

It is meant by top dead center a first extreme position of the piston in which it is at the stroke end, in the extended position; and by bottom dead center a second extreme position of the piston in which it is at the stroke start, in the retracted position. In other words, the piston is arranged to follow a stroke or a travel therein along the housing between the stroke start in which it is at the bottom of the housing and the stroke end in which it is almost extended from the housing, or in any case it is remote from the bottom of the housing.

Advantageously, said at least one supply channel further comprises:
  a portion on the bottom dead center side below the bottom dead center extending along a direction having a radial component and connecting the supply connector to the longitudinal portion, and
  a portion on the top dead center side extending along a direction having a radial component connected to the longitudinal portion and comprising an exhaust hole opening into the housing of the valve body beyond the top dead center, so as to allow the piston to return.

This allows proposing a compact device with efficient operation of the piston, so as to easily actuate the piston and the needle and thus free or block the passage of liquid product towards the spraying means, such as a sprayer or a nozzle.

Advantageously, said at least one supply channel is a continuous duct directly integrated into the monolithic valve body. In other words, the duct has one end which opens into the housing, and another end which opens towards the control fluid connector, and it progresses in the body without joining with a secondary channel machined to form a tortuous path.

This allows proposing a spraying device whose sealing is improved, whose design is simplified and whose operation is optimized.

Advantageously, said at least one supply channel has a diameter less than or equal to 1.5 mm.

This allows proposing a device with small dimensions so as to have a device which is space-saving and very easy to handle, with excellent grip in case of manual use by an operator. Alternatively, if the device is embedded on a painting robot, it is small-dimensioned and therefore light.

Advantageously, the valve body has an external diameter less than or equal to 30 mm.

Advantageously, the valve body has an external diameter less than or equal to 15 mm.

This allows proposing a device with little space requirement and great handling for a user in the context of portable or nomadic use of the device in particular. Alternatively, if the device is embedded on a painting robot, it is small-dimensioned and therefore light.

Advantageously, the valve further comprises a return spring arranged to be accommodated in the housing between the supply connector side and the piston. It is therefore a single-acting valve.

This allows proposing a device with simple and intuitive operation, so as to carry out a painting operation in a gesture from the operator for example.

Advantageously, the needle is arranged to:

open the passage of liquid product towards the spraying means when the control fluid is distributed to the top dead center, close a passage of liquid product towards the spraying means when the control fluid is not distributed to the top dead center.

This allows proposing a device in which an actuation of the device by the user authorizes the spraying of coating liquid, which actuation can be done by a pressure from the user on a trigger or an actuation button of the device for example; when the user releases the trigger, the spraying of coating liquid is stopped or interrupted. The action can also be performed by a robot.

Advantageously, the valve body comprises a plurality of control fluid supply channels accommodated in the wall of the valve body. The plurality of channels increases the control fluid flow rate.

This allows proposing a device with a smooth operation, with an excellent distribution of the forces due to the control fluid and a high reactivity.

Advantageously, each of the plurality of supply channels has an axis parallel to an axis of the piston, or to an axis of the spring or to an axis of the supply connector.

This allows proposing a device having a compact design and a reactive operation.

Advantageously, each of the plurality of supply channels has:

an upstream portion which connects a central connection part to a longitudinal portion remote from an axis of the piston and which runs along the housing, and a downstream portion which connects the longitudinal portion to the housing.

In other words, each upstream portion is oriented at least partially along a radial direction, and the same applies for each downstream portion.

A second aspect of the present invention relates to a method for manufacturing the device according to the first aspect.

Advantageously, the method comprises at least the step consisting of:

manufacturing the valve body by an additive manufacturing method, such as a laser metal printing.

This allows proposing a manufacturing method perfectly adapted to make the monolithic valve body, that is to say in a single part or a single piece, and without holes opening outside or onto an outer surface of the valve body, avoiding any risk of leakage of control fluid. This allows forming at least one supply duct with a tortuous path and/or undercut that opens only towards the connector and the housing. There is no need to make multiple cross drilling operations and then seal the access holes to form the supply channel.

BRIEF SUMMARY OF THE DRAWINGS

Other characteristics and advantages of the present invention will become more apparent upon reading the following detailed description of one embodiment of the invention given by way of non-limiting example and illustrated by the appended drawings, in which.

DETAILED DESCRIPTION

Figure 1:
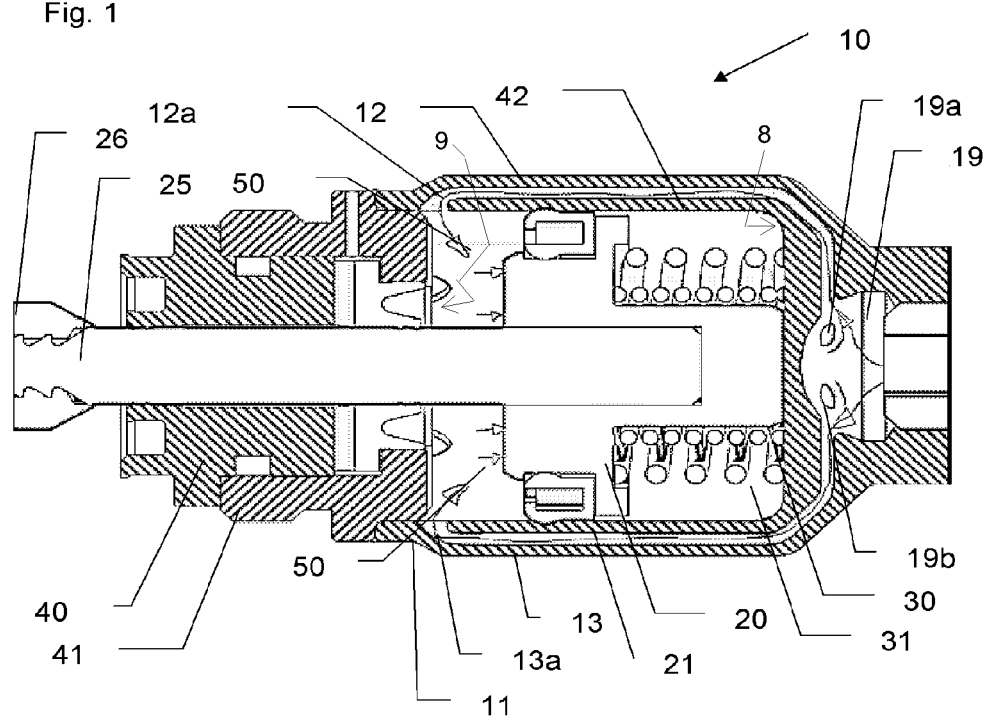
FIG. 1 represents a device for spraying a coating product in liquid form according to a first embodiment of the present invention, in an activated position.

FIG. 1 represents a device for spraying a coating product in liquid form according to a first embodiment of the present invention, in an activated position.

The device for spraying the coating product in liquid form comprises means for spraying the liquid product, also called sprayer 290 (represented in FIG. 6), and a valve 10 for controlling the flow of the liquid product towards the spraying means.

The valve 10 is actuated by a control fluid 50, whose flow and action on a piston 20 of the valve are schematically represented by arrows. The piston 20 is arranged to be moved by the control fluid 50 between a top dead center of the piston 20, on the needle 25 side and a bottom dead center of the piston 20, on the opposite side.

The valve 10 further comprises a needle 25 provided with a needle base 26 and secured to the piston 20. The needle 25 is arranged to respectively free or block a passage of liquid product towards the spraying means, by means respectively of a release or a covering of the needle base 26 on the passage of liquid product.

The valve 10 further comprises a valve body 11 comprising a housing 42 arranged to accommodate the piston 20 and comprising a control fluid supply connector 19 arranged on the bottom dead center side 8 of the piston 20. The piston 20 can therefore cover a stroke between a first extreme position, at the stroke start, from the bottom dead center, on the connector 19 side, and a second extreme position, at the stroke end, to the top dead center, on the needle 25 side, opposite to the connector 19.

The valve body 11 is monolithic and further comprises a plurality of control fluid supply channels 12, 13 accommodated in a side wall of the valve body 11 and whose at least one longitudinal portion extends along part of the housing 42 from the supply connector 19 side to the top dead center side 9. The plurality of supply channels is composed of six supply channels 12, 13, two of which are represented in the cross-section of FIG. 1. The number of supply channels is not to be considered as limiting. It is chosen in the present example in order to allow good dynamic balancing of the piston 20. The connector 19 is composed of a plurality of holes 19a, 19b in a number equal to the number of the plurality of supply channels 12, 13 to which it is connected.

In other words, the supply channels 12, 13 each have an axis parallel to the axis of movement of the piston 20 and to the axis of the needle 25. The connector 19 is placed in alignment with the piston 20 and the needle 25, on the bottom dead center side 8 of the piston 20. The supply channels 12, 13 thus start from the connector 19, more specifically from holes 19a, 19b of the connector 19, on one side of the valve 10 and lead to an opposite side to the connector 19, on the top dead center side 9 of the piston 20, at the through holes 12a, 13a of the supply channels 12, 13.

Thus, the supply channels 12, 13 comprise an initial portion, a central portion, also simply called portion or main portion or even longitudinal portion, and a final portion, in a flow direction in order to actuate the piston 20. The initial portion of the supply channel 12, 13, also called upstream portion, portion on the connector 19 side or portion on the bottom dead center side 8, extends from the connector 19 to the central portion, around the connecting radius at the bottom of the housing 42, without opening into the housing 42. The portion on the bottom dead center side 8 is located below the bottom dead center and along a direction having a radial component.

The central portion of the supply channel 12, 13 extends along part of the housing 42 from the bottom dead center portion to the final portion, also called top dead center portion. In other words, the central portion is longitudinally formed or accommodated in a side wall of the valve body 11 of the valve 11 and opens only onto the bottom dead center portion and onto the top dead center portion. The central portion is connected to the top dead center portion and to the bottom dead center portion.

The top dead center portion of the supply channel 12, 13, also called downstream portion, extends along a direction having a radial component and opens into the housing 42, in a through or exhaust hole 12a, 13a, located beyond the top dead center of the piston 20. In this way, by injecting the control fluid 50, such as a pneumatic fluid, compressed air, or instrument air, or such as a liquid, for example hydraulic oil, which is pressurized, the piston 20 moves in the housing 42 from the top dead center to the bottom dead center, so as to allow the piston 20 to return.

The piston 20 being secured to the needle 25 and to the needle base 26, the needle 25 and the needle base 26 are also movable and the needle base 26 can free or block a passage of liquid product towards the spraying means.

The central portion extends at least beyond half the housing 42 or bore, in one advantageous example.

In other words, the supply channel 12, 13 is a closed duct directly integrated to the monolithic valve body 11.

In one advantageous example, a method for manufacturing the device for spraying the coating product in liquid form comprises at least one step consisting of manufacturing the valve body 11 by an additive manufacturing method, such as laser metal printing or a three-dimensional printing in a plastic material.

Thus, the supply channel 12, 13 does not have connection holes in order to carry out the machining or the casting, that must then be resealed or plugged, with a risk of leakage as long as there is a mechanical interface. In the present invention, there are neither production holes nor plugs that a machining method makes compulsory, that is to say the supply channel 12, 13 has only one through hole 12a, 13a opening into the housing 42 of the valve body 11, but no other holes necessary for the manufacture or the passage of a tool. The valve body 11 can therefore be made in a single piece or a single part, monolithically, thus avoiding the risk of leakage.

The valve body 11 has an external diameter less than or equal to 30 mm in an advantageous example, and less than or equal to 15 mm in a very advantageous example.

The supply channel has a diameter less than or equal to 1.5 mm.

The valve 10 further comprises a piston cover 41 and a piston counter-cover 40, so as to prevent the piston 20 from leaving the housing 42 when the control fluid 50 is supplied to the supply channels 12, 13 from connector 19.

The piston 20 comprises a seal, such as a double-lip seal 21 in order to provide the sealing. The piston 20 is pushed back towards the needle 25 side by two springs 30, 31 accommodated in the housing 42 of the valve body 11, between the piston 20 and the bottom of the housing 42 on the connector 19 side.

Figure 2:
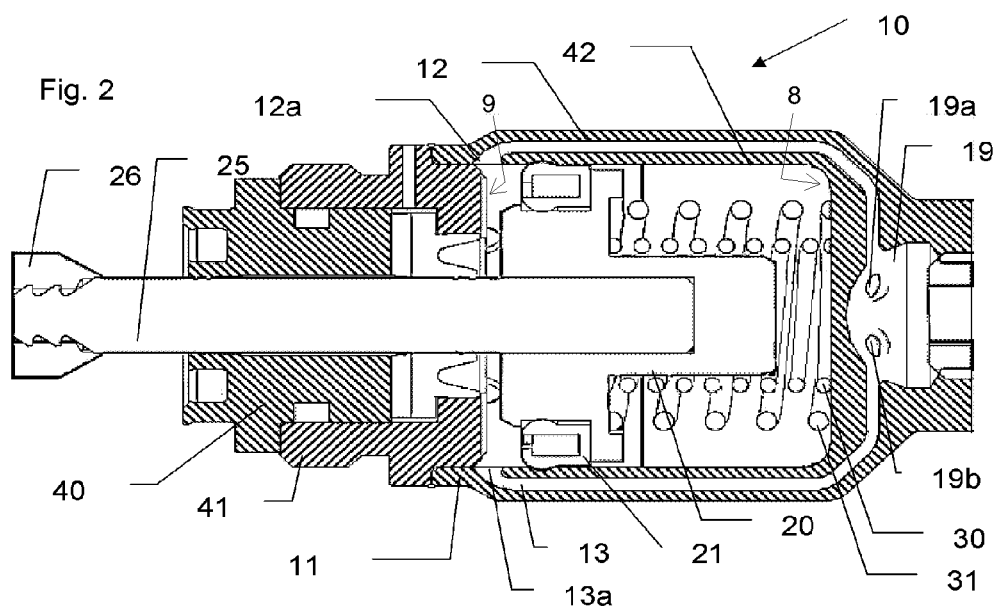
FIG. 2 represents the device for spraying the coating product in liquid form according to the first embodiment of the present invention, in a deactivated position.

FIG. 2 represents the device for spraying the coating product in liquid form according to the first embodiment of the present invention, in a deactivated position.

The valve 10 in FIG. 1 uses the same embodiment as the one illustrated in FIG. 1. The valve 10 comprises the valve body 11, the piston 20 provided with its lip seal 21, secured to the needle 25 provided with the needle base 26. The piston 20 is pushed back towards the top dead center by the springs 30, 31 accommodated in the housing 42 of the valve body 11. The needle 25 being secured to the piston 20, it will free or block the passage of liquid product towards the spraying means, in a manner contrary to FIG. 1. In one advantageous example, the actuation of the piston 20 by the control fluid 50 in the direction of the bottom dead center represented in FIG. 1 makes the needle 25 and its needle base 26 move so as to free the passage of liquid product towards the spraying means; whereas in FIG. 2, the springs 30, 31 push back the piston 20 in the direction of the top dead center by making the needle 25 and its needle base 26 move so as to block the passage of liquid product towards the spraying means.

The valve body 11 comprises the supply channels 12, 13 comprising a bottom dead center portion connecting the connector 19 provided with holes 19a, 19b, to the central portion of the supply channels 12, 13, accommodated in the side wall of the valve body 11 and extending longitudinally and parallel to the housing 42 up to the top dead center portion, opening into the housing 42 by means of through or exhaust holes 12a, 13a. The housing 42 is cylindrical in one advantageous example, just as the piston 20. The entire supply channel 12, 13 and its different portions is accommodated in the valve body 11.

In other words, in FIGS. 1 and 2, the control fluid 50 supply is made in the side wall of the valve body 11, the wall forming a valve cap 10. The arrangement of the supply channel 12, 13 from the connector 19 on one side of the valve, on the bottom dead center side 8 towards the top dead center side 9 of the piston 20 has a very compact design and avoids having machining holes or holes opening outside the valve body 11, thereby improving the sealing and the operating reactivity.

In FIG. 1, the control fluid 50 is pressurized and allows actuating or activating the valve 10 by moving the piston 20 from the top dead center towards the bottom dead center. In FIG. 2, the control fluid 50 is not represented because it is not pressurized and has been discharged, in order to allow the springs 30, 31 to push back the piston 20 towards the top dead center.

Figure 3:
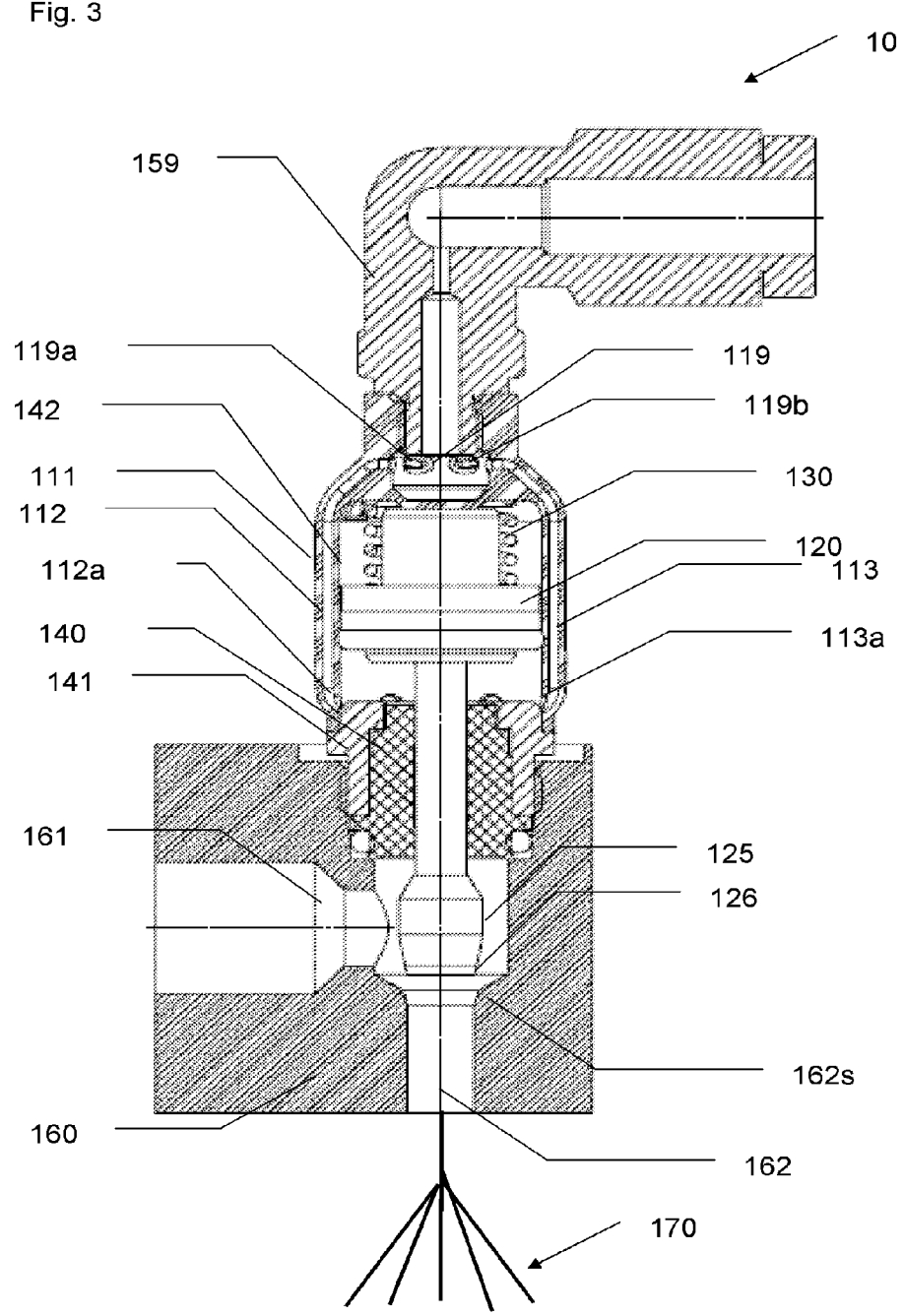
FIG. 3 represents the device for spraying coating product in liquid form according to a second embodiment of the present invention, in an activated position.

FIG. 3 represents the device for spraying coating product in liquid form according to a second embodiment of the present invention, in an activated position.

The second embodiment of the present invention uses the main elements of the first embodiment. The device for spraying coating product in liquid form comprises the valve 10.

The valve 10 comprises the valve body 111, the piston 120 provided with a seal, secured to the needle 125 provided with the needle base 126. The piston 120 is pushed back towards top dead center by the spring 130 accommodated in the housing 142 of the valve body 111. The needle 125 being secured to the piston 120, it will free the passage 162s of liquid product from a block body 160 to the spraying means 170, schematically represented, by means of a distribution bore 162 of a block body 160. The block body 160 is supplied with coating product in liquid form through a supply bore 161, connected to a container of liquid coating product of the spraying device, such as a paint canister.

The valve body 111 comprises the supply channels 112, 113 comprising the bottom dead center portion connecting the connector 119 provided with holes 119*a*, 119*b*, to the central portion of the supply channels 112, 113, accommodated in the side wall of the valve body 111 and extending longitudinally and parallel to the housing 142 up to the top dead center portion, opening into the housing 142 by means of through or exhaust holes 112*a*, 113*a*. The housing 142 is cylindrical in one advantageous example, just as the piston 120. The entire supply channel 112, 113 and its different portions is accommodated in the valve body 111. The piston 120 is retained at the stroke end by the cover 141 and the counter-cover 140.

The spraying device further comprises a supply body 159 connected to the valve 10 by means of the connector 119. For clarity, the control fluid 50 is not represented.

Figure 4:
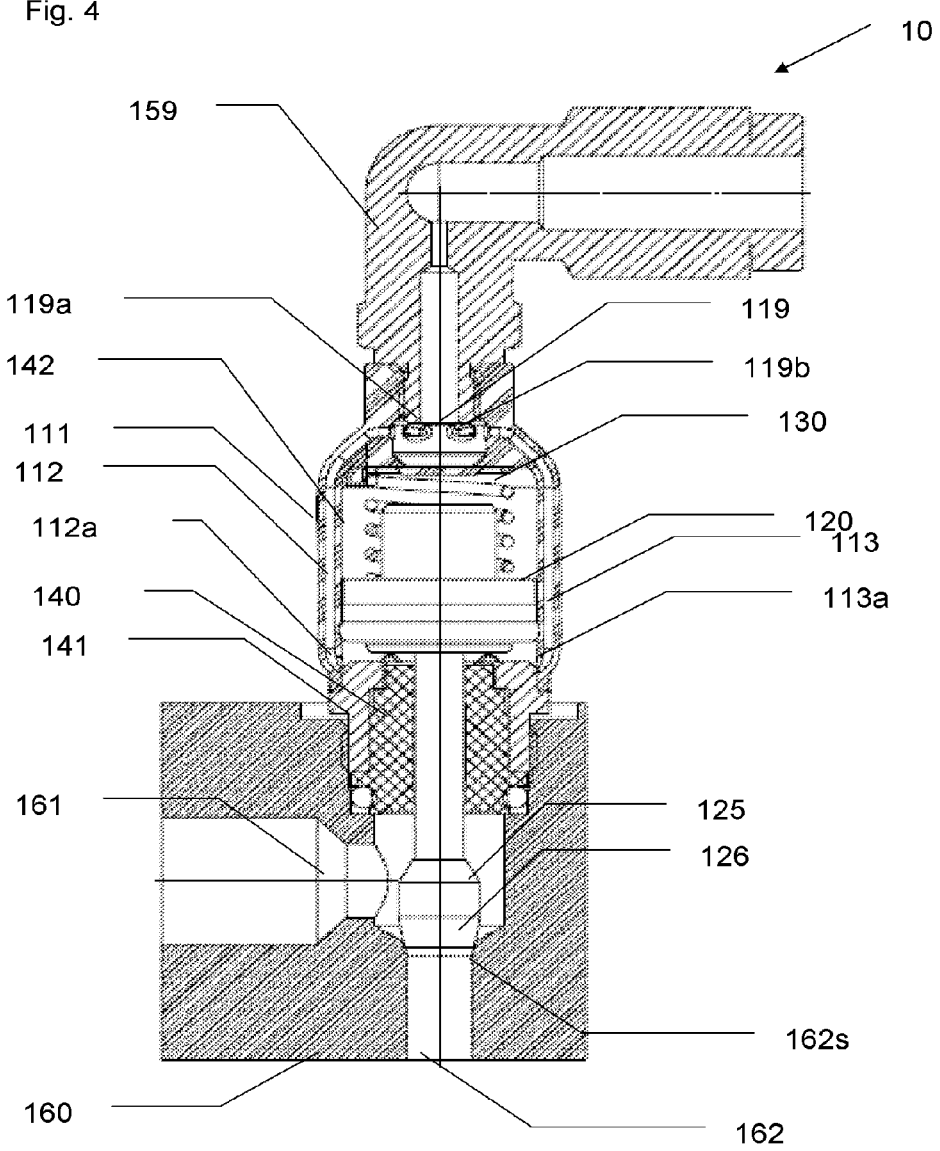
FIG. 4 represents the device for spraying coating product in liquid form according to the second embodiment of the present invention, in a deactivated position.

FIG. 4 represents the device for spraying coating product in liquid form according to the second embodiment of the present invention, in a deactivated position.

The device illustrated in FIG. 4 is the same as the one illustrated in FIG. 3. It is represented in a deactivated position, that is to say the needle base 126 blocks the passage 162*s* of liquid product from the block body 160 to the spraying means, the needle 125 resting on the seat-shaped passage 162*s*, and blocking the liquid coating product supplied from the supply bore 161.

Figure 5:
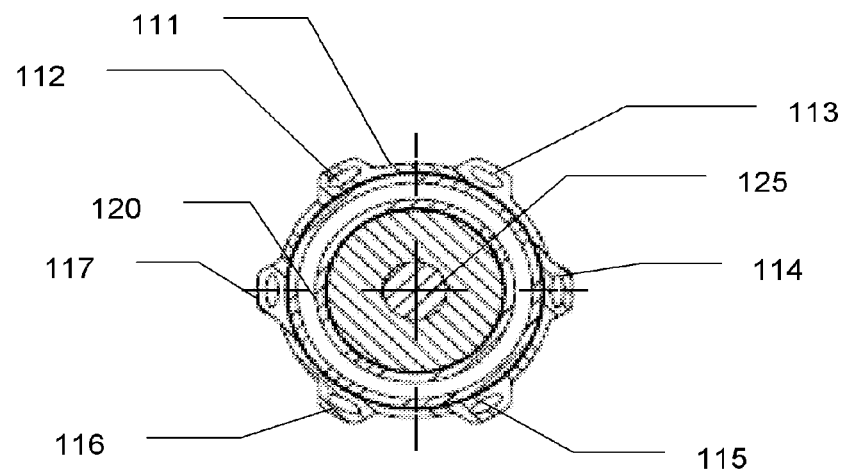
FIG. 5 represents a cross-section at a needle of the spraying device according to the second embodiment.

FIG. 5 represents a cross-section at a needle of the spraying device according to the second embodiment.

The plurality of supply channels 112, 113 comprises six supply channels 112, 113, 114, 115, 116, 117 accommodated in the valve body 111 and angularly distributed. The needle 125 and the piston 120 are also represented.

Figure 6:
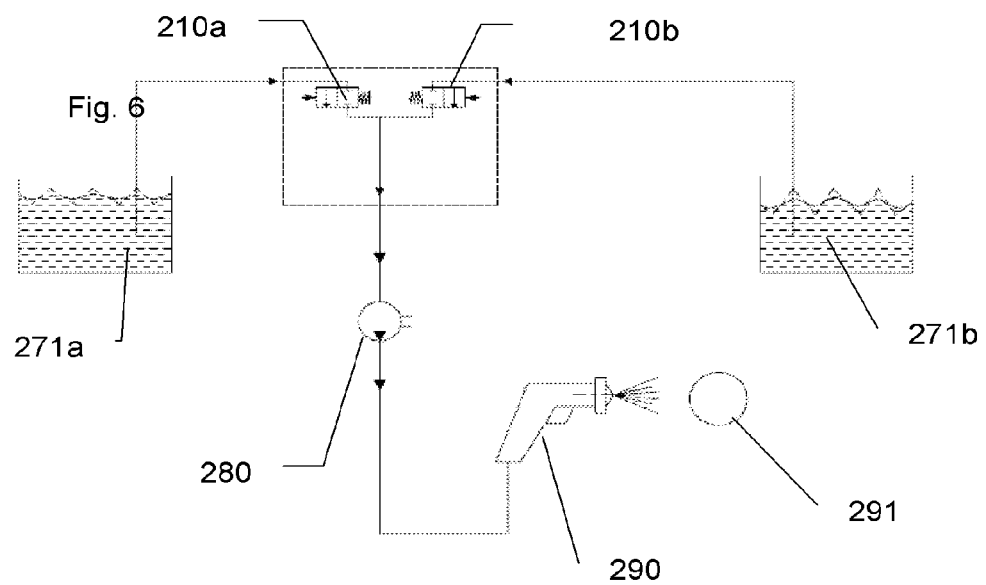
FIG. 6 represents an operating diagram according to a third embodiment of the present invention.

FIG. 6 represents the operating diagram according to the third embodiment of the present invention.

The device for spraying coating product in liquid form comprises, in the third embodiment, two valves 210*a* and 210*b*, schematically represented. Each valve 210*a*, 210*b* is connected to a reservoir of coating product in liquid form 271*a*, 271*b*, respectively, by means of ducts, schematically represented. The two reservoirs can contain the same product in order to constantly increase the production capacity (spare reservoir) or different products in order to carry out product changes on the fly for example, by quickly distributing one product after the other. This may be the case, for example, of a coating under-layer product covered with an over-layer or final layer product, or products used one after the other on a stencil for example.

The spraying device further comprises a metering pump 280 and the spraying means, such as a sprayer 290 or a paint gun. The device allows spraying the coating products 271*a*, 271*b* together or alternately, onto the part to be covered or painted 291, schematically represented.

It will be understood that various modifications and/or improvements that are obvious to those skilled in the art can be made to the various embodiments of the invention described in the present description. Particularly, reference is made to an adaptation of the number of channels of the pluralities of supply channels 112, 113.

The invention claimed is:

1. A device for spraying a coating product in liquid form, comprising:
    means for spraying the liquid product,
    a valve for controlling the flow of the liquid product towards the spraying means, the valve being actuated by a control fluid and comprising:
        a piston arranged to be moved by the control fluid between a top dead center and a bottom dead center,
        a needle secured to the piston and arranged to free or block a passage of liquid product towards the spraying means,
        a valve body comprising a housing arranged to accommodate the piston, and comprising a control fluid supply connector arranged on the bottom dead center side,
    wherein the bottom dead center further includes a portion located on a side of the bottom dead center side and extending along a direction having a radial component and connecting the supply connector to the longitudinal portion,
    wherein the top dead center further includes a portion located on a side of the top dead center side and extending along a direction having a radial component connected to the longitudinal portion and comprising an exhaust hole opening into the housing of the valve body beyond the top dead center, so as to allow the piston to return, and
    wherein the device being characterized in that the valve body is monolithic and further comprises at least two control fluid supply channels formed in a side wall of the valve body and whose at least one longitudinal portion extends along part of the housing from the supply connector side to the top dead center side, and a number of the at least two supply channels is arranged dependent upon dynamic balancing of the piston.

2. The device according to claim 1, wherein said at least two fluid supply channels are a continuous duct directly integrated into the monolithic valve body.

3. The device according to claim 1, wherein said at least two control fluid supply channels has a diameter less than or equal to 1.5 mm.

4. The device according to claim 1, wherein the valve body has an external diameter less than or equal to 30 mm.

5. The device according to claim 1, wherein the valve further comprises a return spring arranged to be accommodated in the housing between a supply connector side and the piston.

6. The device according to claim 5, the needle being arranged to:
    open the passage of liquid product towards the spraying means when the control fluid is distributed to the top dead center,
    close a passage of liquid product towards the spraying means when the control fluid is not distributed to the top dead center.

7. The device according to claim 1, wherein the valve body comprises at least three fluid supply channels accommodated in the wall of the valve body.

8. The device according to claim 7, wherein each of the plurality of supply channels has an axis parallel to an axis of the piston, or to an axis of the spring or to an axis of the supply connector.

9. The device according to claim 1, further comprising the control fluid supply connector arranged in alignment with the piston and the needle on the bottom dead center side of the piston.

10. The device according to claim 1, wherein the piston comprises at least one of a seal and a double-lip seal configured to enable provision of a seal.

* * * * *